(12) United States Patent
Fabre et al.

(10) Patent No.: US 9,616,629 B2
(45) Date of Patent: Apr. 11, 2017

(54) BLADE HAVING AN INTEGRATED COMPOSITE SPAR

(71) Applicant: SNECMA, Paris (FR)

(72) Inventors: Adrien Jacques Philippe Fabre, Montrouge (FR); Nicolas Horn, Paris (FR); David Marsal, Saint Aubin de Medoc (FR); Jean-Marc Claude Perrollaz, Hericy (FR)

(73) Assignee: SNECMA, Paris (FR)

( * ) Notice: Subject to any disclaimer, the term of this patent is extended or adjusted under 35 U.S.C. 154(b) by 1323 days.

(21) Appl. No.: 13/732,884

(22) Filed: Jan. 2, 2013

(65) Prior Publication Data

US 2013/0272893 A1 Oct. 17, 2013

Related U.S. Application Data

(63) Continuation-in-part of application No. PCT/FR2011/051474, filed on Jun. 24, 2011.

(51) Int. Cl.
  *F01D 5/28* (2006.01)
  *B64C 11/26* (2006.01)
  (Continued)

(52) U.S. Cl.
  CPC ........ *B29D 99/0025* (2013.01); *B29C 70/222* (2013.01); *B29C 70/24* (2013.01);
  (Continued)

(58) Field of Classification Search
  CPC .. B29D 99/0025; D03D 25/005; F01D 5/141; F01D 5/282; F04D 29/388; F04D 29/324;
  (Continued)

(56) References Cited

U.S. PATENT DOCUMENTS

| 5,222,297 A | 6/1993 | Graff et al. |
| 6,666,651 B2 | 12/2003 | Rust |

(Continued)

FOREIGN PATENT DOCUMENTS

| EP | 1 526 285 A1 | 4/2005 |
| FR | 2.007.891 | 1/1970 |
| WO | 2006/136755 A2 | 12/2006 |

OTHER PUBLICATIONS

Dowty Rotol Limited, "Composite Materials in Propellers," 751 Aircraft Engineering 11, pp. 10-15, Nov. 1989.

(Continued)

*Primary Examiner* — Christopher Verdier
(74) *Attorney, Agent, or Firm* — Oblon, McClelland, Maier & Neustadt, L.L.P.

(57) ABSTRACT

A blade including a structure with aerodynamic profile including two opposite skins obtained by three-dimensional weaving of a fibrous reinforcement densified by a matrix, and a longeron including a fibrous reinforcement obtained by three-dimensional weaving and densified by a matrix, the longeron including a first part extending outside the structure with aerodynamic profile and designed to be connected to a drive hub in rotation of the blade and a second part arranged inside the structure with aerodynamic profile between the two skins. The second part of the longeron has a thickness substantially similar to that of the skins of the structure with aerodynamic profile. In addition, the fibrous reinforcement of the second part of the longeron has the same weaving armor as that of the reinforcement of the skins of the structure with aerodynamic profile.

18 Claims, 15 Drawing Sheets

(51) Int. Cl.
  *B29D 99/00* (2010.01)
  *B29C 70/22* (2006.01)
  *B29C 70/24* (2006.01)
  *F04D 29/02* (2006.01)
  *F04D 29/32* (2006.01)
  *F04D 29/38* (2006.01)
  *F01D 5/14* (2006.01)
  *D03D 25/00* (2006.01)
  *B64C 27/473* (2006.01)

(52) U.S. Cl.
  CPC ............ *B64C 11/26* (2013.01); *D03D 25/005* (2013.01); *F01D 5/141* (2013.01); *F01D 5/282* (2013.01); *F04D 29/023* (2013.01); *F04D 29/324* (2013.01); *F04D 29/388* (2013.01); *B64C 2027/4736* (2013.01); *F05D 2300/224* (2013.01); *F05D 2300/6033* (2013.01); *F05D 2300/6034* (2013.01); *F05D 2300/702* (2013.01); *Y02T 50/433* (2013.01); *Y02T 50/672* (2013.01); *Y02T 50/673* (2013.01)

(58) Field of Classification Search
  CPC ..... F04D 29/325; F04D 29/023; B29C 70/24; B29C 70/222; B64C 11/26; B64C 2027/4736; F05D 2300/6033; F05D 2300/603; F05D 2300/224; F05D 2300/702; F05D 2300/6034; Y02T 50/433; Y02T 50/672; Y02T 50/673
  USPC ...................................... 416/226, 230, 241 A
  See application file for complete search history.

(56) References Cited

U.S. PATENT DOCUMENTS

| 2005/0042109 | A1  | 2/2005 | Kovalsky et al. |
| 2010/0144227 | A1* | 6/2010 | Coupe ................... B29C 70/24 442/207 |
| 2011/0052405 | A1* | 3/2011 | Parkin ................... F01D 5/147 416/230 |

OTHER PUBLICATIONS

International Search Report and Written Opinion for International Application PCT/FR2011/051474 on Nov. 3, 2011.

\* cited by examiner

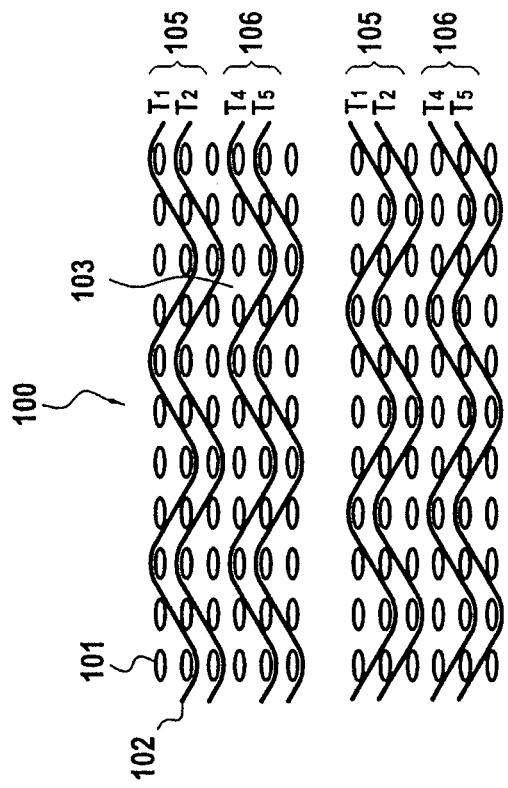
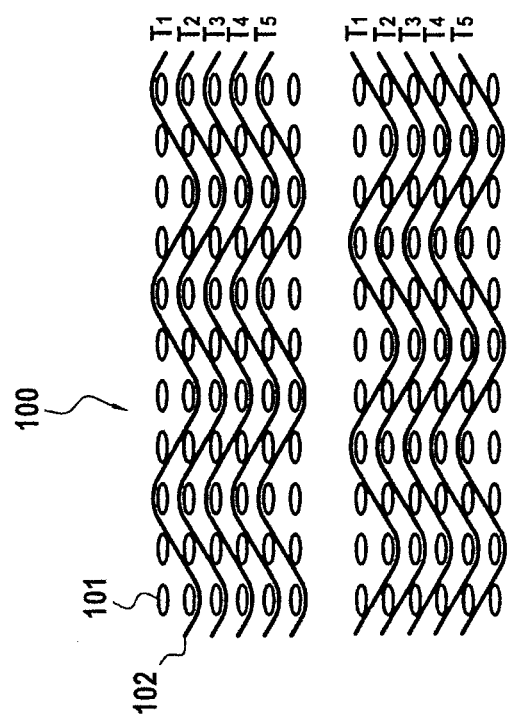
FIG.4B
FIG.4A

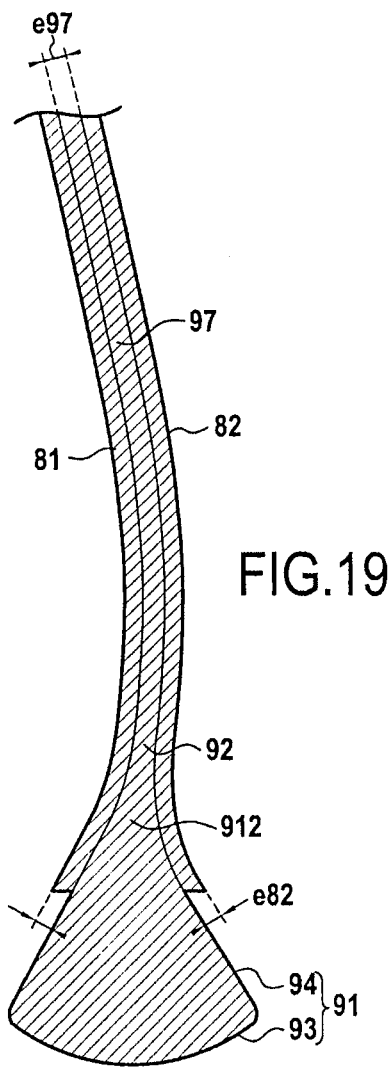
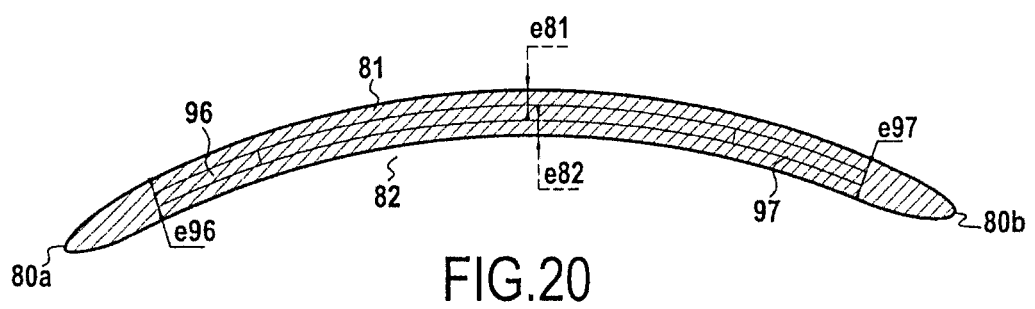

BLADE HAVING AN INTEGRATED COMPOSITE SPAR

CROSS-REFERENCE TO RELATED APPLICATIONS

This application is a continuation-in-part of PCT/FR2011/051474 filed Jun. 24, 2011, which is based upon and claims the benefit of priority from prior French Patent Application No. 1055360 filed Jul. 2, 2010, the entire contents of each of which are incorporated herein by reference.

BACKGROUND OF THE INVENTION

The present invention relates to the field of blades such as those used in fans of turboprops or designed to form propeller vanes for aircraft.

These blades are generally made of metal material. If blades made of metal material have good mechanical resistance, they still have the disadvantage of having a relatively large mass.

To produce lighter blades, it is known to make blades of composite material, that is, by making at least one part of the pieces of the blade from a fibrous reinforcement densified by a resin matrix.

The technique generally used consists of forming a skin about a core or longeron made of metal material also integrating the stilt and the blade foot, by stacking unidirectional pre-impregnated folds or layers (draping) on the longeron, the whole then being placed in a mould by variously orienting the successive folds, prior to compacting and polymerisation by autoclave. An example of an embodiment of a propeller blade according to this technique is especially described in document U.S. Pat. No. 6,666,651.

This type of blade structure breaks down into two sub-structures, specifically the skin which corresponds to the first millimeters of material under the intrados and extrados surfaces and the rest of the structure which is composed essentially of the longeron, the stilt and the blade foot. Most often, the skin ensures only the aerodynamic and aeroelastic behaviour of the blade whereas the rest of the structure ensures the structural behaviour of the blade (resistance to impact, overspeeds, etc.).

However this type of structure is not optimal in that concentrations of stresses and irregularities in deformations appear between the skin made of composite material and the rest of the structure, preventing even transmission of forces exerted on the skin towards the rest of the structure intended to ensure the structural behaviour of the blade. It is therefore very difficult in this case to avoid creating weakness zones in the blade and consequently obtaining reliable mechanical behaviour.

To especially improve resistance to impact and reduce the risks of delaminating in composite blades, blades have been manufactured by three-dimensional weaving of a fibrous preform and densification of the preform by an organic matrix as described in document EP 1 526 285. This process produces blades having very high mechanical resistance. But, according to this technique the whole of the structure of the blade, specifically the skin and the rest of the structure (longeron, stilt and foot) is made from one and the same continuously woven fibrous reinforcement, but as a variant to armour as a function of the parts of the blade to be manufactured.

This type of production does not structurally dissociate the skin from the rest of the structure of the blade, which reduces its capacity to be arranged inside the blade, such as for example integration of cooling ducts, deicing elements and/or introduction of low-density material to lighten the overall mass of the blade.

SUBJECT MATTER AND SUMMARY OF THE INVENTION

It is therefore preferable to be able to place blades the structure of which can be broken down into at least two parts while exhibiting reliable mechanical behaviour.

For this purpose, according to the invention a blade is proposed, comprising:
  a structure with aerodynamic profile comprising two opposite skins obtained by three-dimensional weaving of fibrous reinforcement densified by a matrix,
  a longeron comprising a fibrous reinforcement obtained by three-dimensional weaving densified by a matrix, said longeron comprising a first part extending outside said structure with aerodynamic profile and designed to be connected to a drive hub in rotation of the vane and a second part arranged inside
  the structure with aerodynamic profile between the two skins, the second part of said longeron having mainly a thickness substantially similar to that of the skins of the structure with aerodynamic profile, and
  the fibrous reinforcement of the second part of the longeron having the same weaving armour as that of the reinforcement of the skins of the structure with aerodynamic profile.

The blade of the invention has a structure dissociating the skin from the rest of the blade, specifically at least the longeron, while ensuring even transmission of forces between these elements.

In fact, since the longeron comprises a three-dimensional reinforcement having the same armour as the skins of the structure with aerodynamic profile, and has a thickness similar to that of the skins in its second part, specifically its upper part situated above the stilt and the blade foot, this ensures efficacious and even transmission of forces between the structure with aerodynamic profile and the longeron without concentration zones of stresses or deformations. In this way, the longeron will follow the movements of the skins of the structure with aerodynamic profile without opposing them, that is, without engendering excessive stresses, which would not be possible with a longeron having a structure different to that of the skins or made from material having stiffeners different to those of the skins. In the part of the blade common to that of the skins and the second part of the longeron, the skins and the longerons have similar stiffness.

According to an aspect of the invention, the first part of the longeron extends underneath the second part of the longeron according to increasing thickness. Therefore, the first part of the longeron has increasing thickness from its junction with the second part of the longeron and as far as its free end comprising the foot of the blade. This increase in thickness of the longeron outside the skins allows the latter to absorb the forces exerted on the blade at the level of its foot.

According to another aspect of the invention the variation in thickness between the thickness of the skins and the thickness of the second part of the longeron is less than 40%.

According to an embodiment of the invention, the second part of the longeron comprises two symmetrical portions, one arranged opposite one of the two skins of the structure with aerodynamic profile and the other arranged opposite the other skin, each symmetrical portion having a thickness substantially similar to that of the skin adjacent to the structure with aerodynamic profile.

By dividing up the second part of the longeron, the latter is given a topology of "double skin" type which forms skins of reduced thickness relative to the remaining part of the longeron which is monolithic, and can accordingly best approximate the thickness of the skins of the structure with aerodynamic profile.

According to an aspect of the invention, a moulded piece made of rigid cellular material is further arranged between the two symmetrical portions of the second part of the longeron, which facilitates forming and lightening the overall mass of the blade.

According to another embodiment, the second part of the longeron comprises two legs spaced apart from each other by a central recess and each having a thickness substantially similar to that of the skins of the structure with aerodynamic profile.

As for the abovementioned "double skin" topology, the second part of the longeron has essentially non-monolithic topology, this part being divided into two legs which will follow the movements of the skins of the structure with aerodynamic profile without engendering excessive stresses.

A moulded piece made of rigid cellular material is arranged in the central recess to facilitate forming and lightening of the overall mass of the blade.

The blade of the invention can be designed to be integrated into a turboprop, for example as a fan blade, or form an aircraft propeller blade.

The invention also specifies a manufacturing process of a blade comprising at least:
  making a first fibrous preform of a structure with aerodynamic profile by three-dimensional weaving of threads, said preform comprising two skins delimiting between them an internal space,
  making a second fibrous preform of a longeron by three-dimensional weaving of threads, said second preform comprising a first and a second portion, the second portion having mainly a thickness substantially equal to that of the skins of the first preform and armour identical to that of said skins,
  forming the first fibrous preform to produce a preform of structure with aerodynamic profile, said forming comprising the arranging of the second part of the second preform in the internal space between the two skins of the first fibrous preform,
  densification of the first and second preforms by a matrix to produce a blade comprising a structure with aerodynamic profile and a longeron, each having a fibrous reinforcement densified by the matrix.

According to an embodiment of the process of the invention, during manufacture of the second fibrous preform of the longeron, the second portion of said second fibrous preform is divided into two symmetrical parts in the direction of the thickness of said second portion, each symmetrical part having a thickness substantially similar to that of the skin of the first fibrous preform with which it is designed to be opposite during forming of the first fibrous preform.

In this case, during forming of the first fibrous preform, at least one moulded piece made of rigid cellular material is arranged between the two symmetrical parts of said second portion.

According to another embodiment of the invention, during manufacture of the second fibrous preform of the longeron a central recess is made in the second portion of said second fibrous preform, said recess delimiting two parts spaced apart from each other by the central recess and each having a thickness substantially similar to that of the skins of the structure with aerodynamic profile.

In this case, during forming of the first fibrous preform, at least one moulded piece made of rigid cellular material is arranged in the central recess.

According to an aspect of the invention, the first portion of the second fibrous preform comprises further a thickened part extended by a part of decreasing thickness towards the second portion of the second preform, said thickened part and part of decreasing thickness forming respectively, after densification, a foot and a blade stilt.

The fibrous reinforcements of the longeron and skins can be made using fibres of the same kind or different kinds. Similarly for matrices used for densifying, the fibrous reinforcements of the longeron and skins can be of the same kind or different kind.

Another aim of the invention is a turboprop equipped with a blade or propeller blade according to the invention.

Yet another aim of the invention is an aircraft equipped with at least one turboprop according to the invention.

BRIEF DESCRIPTION OF THE DRAWINGS

Other characteristics and advantages of the invention will emerge from the following description of particular embodiments of the invention, given by way of non-limiting examples, in reference to the attached drawings, in which.

DETAILED DESCRIPTION OF EMBODIMENTS

The invention applies generally to different types of blades such as fan blades or vanes propeller used in aircraft engines such as planes or helicopters. The invention applies advantageously though not exclusively to propeller vanes of large dimensions which, due to their size, have considerable mass having significant impact on the mechanical behaviour of the vanes and the overall mass of the aircraft engine.

Figure 1:
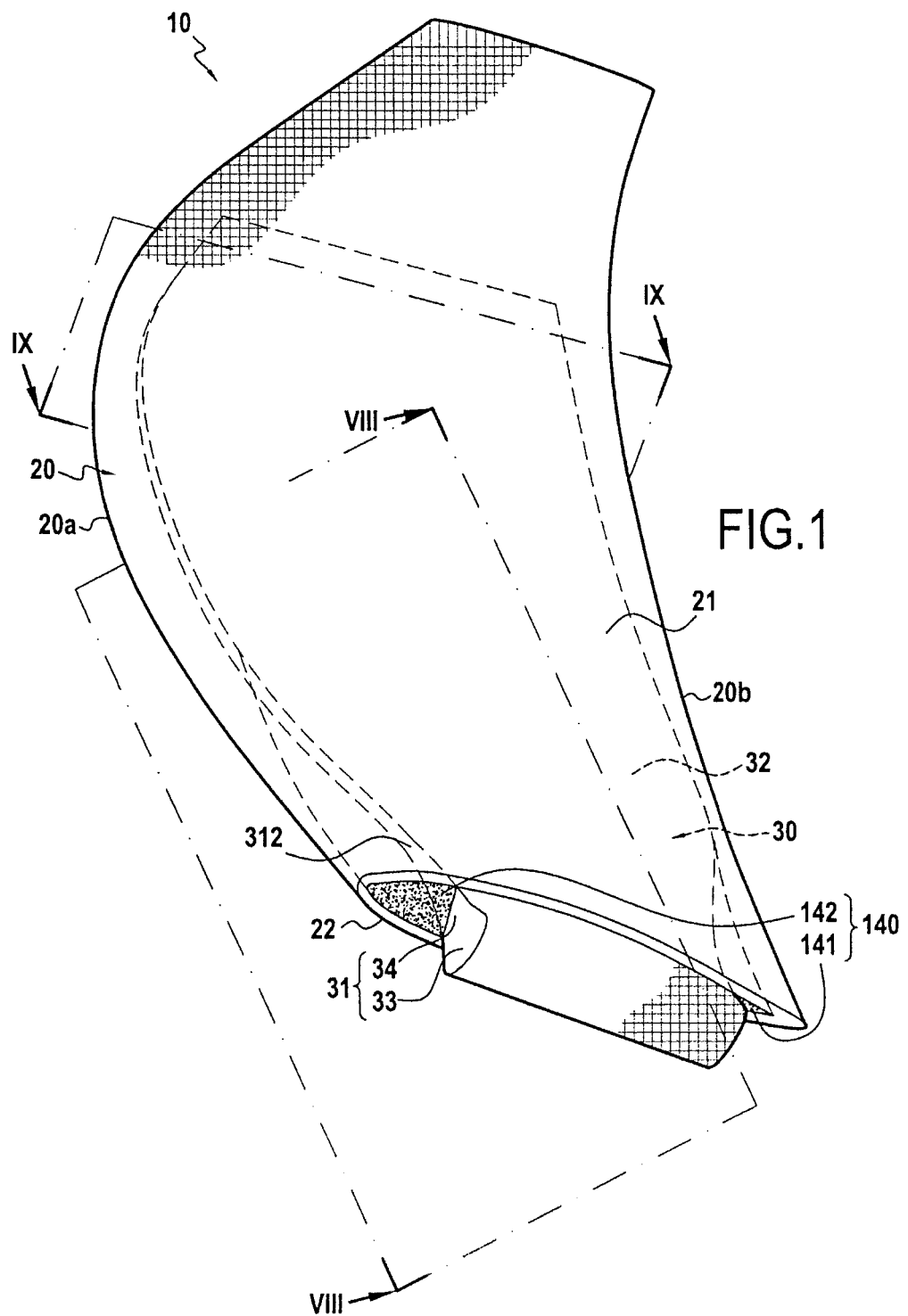
FIG. 1 is a perspective view of an aircraft propeller blade according to an embodiment of the invention.

FIG. 1 illustrates a propeller blade 10 designed to be mounted on a plane turboprop which comprises, as is well known per se, a structure with aerodynamic profile 20 designed to form the aerodynamic part of the vane, a foot 33 formed by a part of greater thickness, for example having a cross-section in bulb form, prolonged by a stilt 34. In transversal section the structure with aerodynamic profile 20 has a curved profile of variable thickness between its leading edge 20a and its trailing edge 20b. In accordance with the invention, the propeller blade 10 comprises a longeron 30 comprising a first part 31 extending outside the structure with aerodynamic profile 20 and comprising the foot 33 and the stilt 34 and a second part 32 arranged inside the structure with aerodynamic profile 20.

Figure 2:
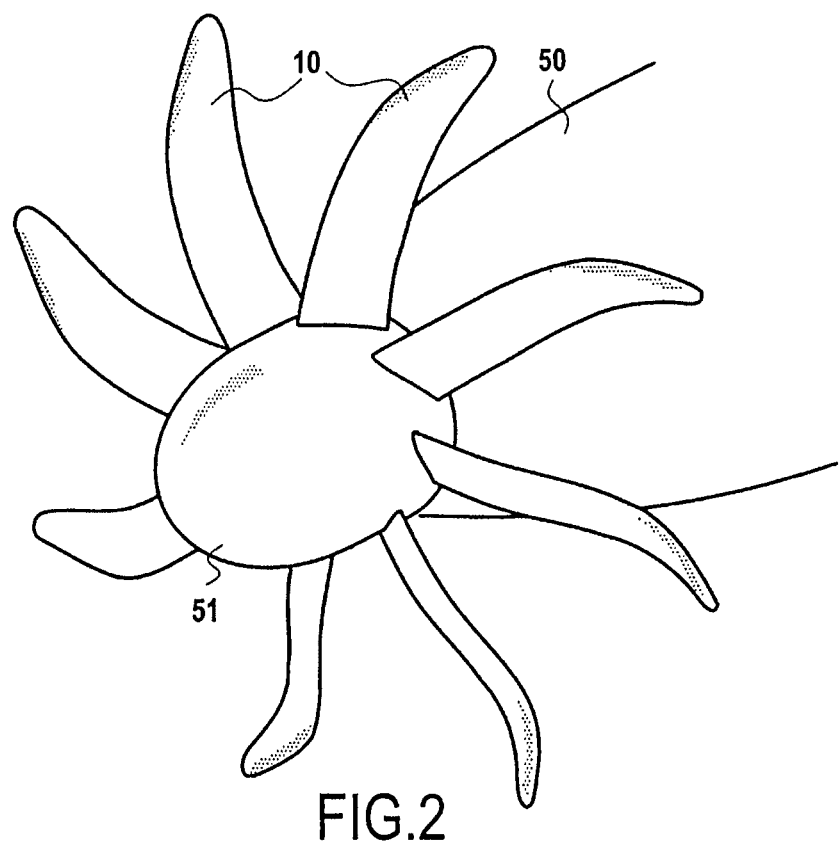
FIG. 2 is a perspective view of a turboprop equipped with a plurality of propeller vanes according to the invention.

As illustrated in FIG. 2, the vane 10 is mounted on a rotor 51 of a turboprop 50 by the foot 33 engaging in a housing made at the periphery of the rotor 51 (not shown in FIG. 2).

Figure 3:
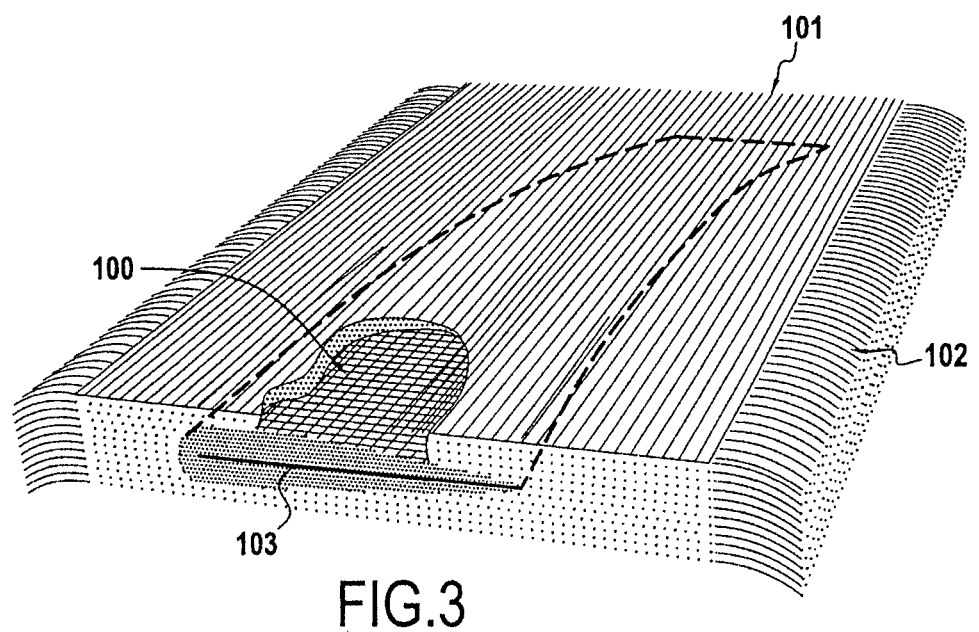
FIG. 3 is a schematic view illustrating the 3D weaving of a fibrous preform for manufacturing a structure with aerodynamic profile of the propeller blade of FIG. 1, FIGS. 4A and 4B are partial sectional views on an enlarged scale of a set of layers of threads forming the preform of FIG. 1.

FIG. 3 shows highly schematically a fibrous preform 100 designed to form the fibrous preform of the structure with aerodynamic profile of the vane.

As illustrated schematically in FIG. 3, the fibrous preform 100 is obtained by three-dimensional weaving (3D) performed as is known by means of a loom of jacquard type on which a bundle of warp threads 101 or strands is arranged in a plurality of layers of several hundreds of threads each, the warp threads being bound by weft threads 102.

In the example illustrated, 3D weaving is "interlock" armour weaving. "Interlock" weaving here means weaving armour in which each layer of weft threads binds several layers of warp threads with all the threads of the same weft column having the same movement in the plane of the armour.

Other known types of three-dimensional weaving could be used, especially those described in document WO 2006/136755 the content of which is incorporated here by way of reference.

The fibrous preform according to the invention can be woven from threads of carbon or ceramic fibre such as silicon carbide.

During weaving of the fibrous preform whereof the thickness and the width vary, a certain number of warp threads is not woven, which defines the preferred contour and thickness, continuously variable, of the preform 100. An example of evolutive 3D weaving which especially varies the thickness of the preform between a first edge intended to form the leading edge and a second edge of lesser thickness and intended to form the trailing edge is described in the document EP 1 526 285 the content of which is incorporated here by reference.

Figure 6:
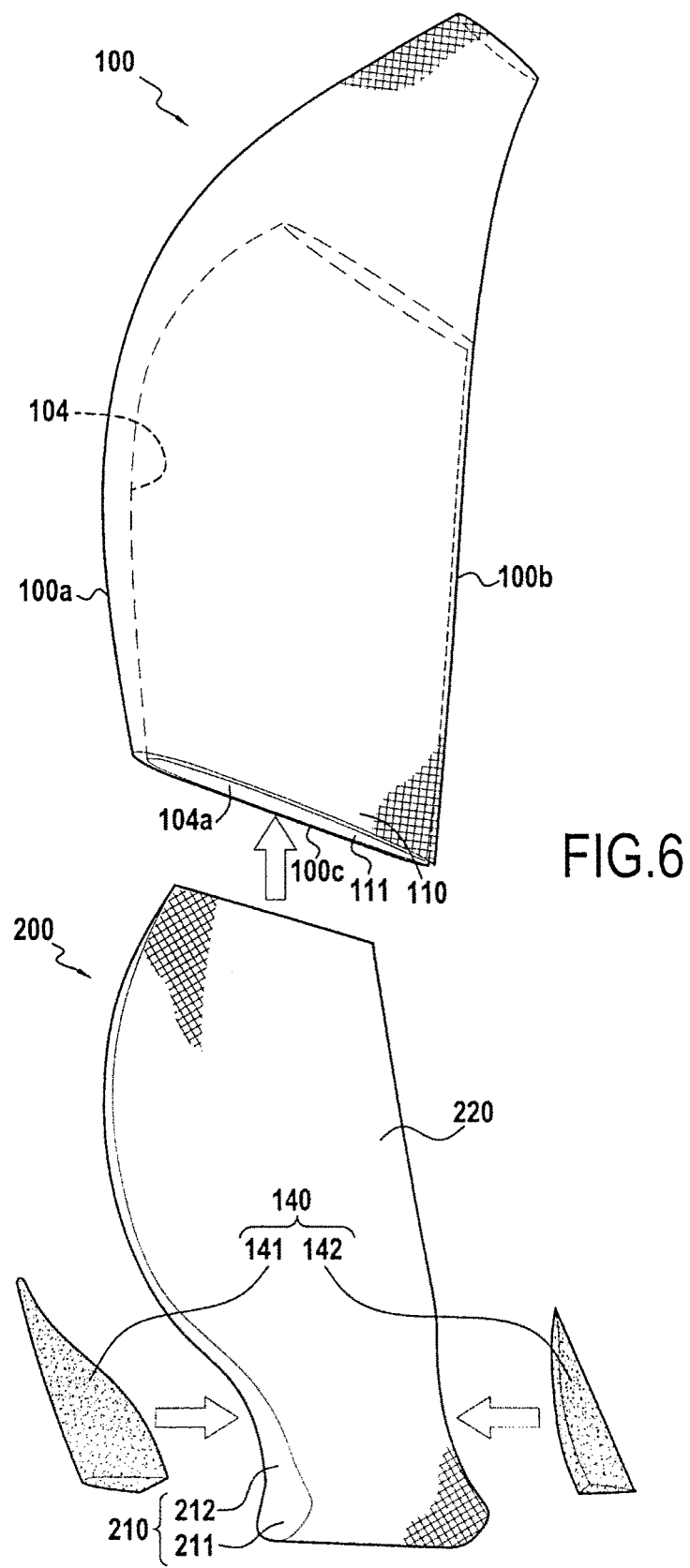
FIG. 6 is an exploded view showing the manufacture of the propeller blade of FIG. 1.

During weaving, disconnection 103 (FIG. 3) is made inside the fibrous preform between two successive layers of warp threads and on a disconnection zone 104 (FIG. 6). The disconnection zone 104 makes a cavity 104a for introduction of a longeron, and optionally one or more moulded pieces, inside the fibrous preform 100 in view of the formation of the preform of the structure with aerodynamic profile.

A 3D interlock armour weaving mode of the preform 100 is shown schematically by FIGS. 4A and 4B. FIG. 4A is a partial enlarged view of two successive warp sectional planes in a part of the preform 100 having no disconnection, that is, in a zone of the preform located outside the disconnection zone 104, whereas FIG. 4B shows two successive warp sectional planes in the part of the preform 100 having a disconnection 103 forming the disconnection zone 104.

In this example, the preform 100 comprises 6 layers of warp threads 101 extending in a direction. In FIG. 4A, the 6 layers of warp threads are bound by weft threads $T_1$ to $T_5$. In FIG. 4B, 3 layers of warp threads 101 forming the set of layers of threads 105 are bound together by two weft threads $T_1$, $T_2$, as well as the 3 layers of warp threads forming the set of layers of threads 106 are bound by two weft threads $T_4$ and $T_5$. In other terms, the fact that the weft threads $T_1$, $T_2$ do not extend into the layers of threads 106 and the weft threads $T_4$, $T_5$ do not extend into the layers of threads 105 ensures the disconnection 103 which separates the sets of layers of warp threads 105, 106 from each other.

At the end of weaving (FIG. 3), the warp and weft threads are cut off for example using a pressurised water jet to the limit of the woven mass to extract the preform 100 illustrated in FIG. 6 such as originates from 3D weaving and prior to any conformation. The disconnection zone 104 made during weaving forms two portions 110 and 111 woven independently of each other delimiting a cavity 104a inside the preform 100. The two portions 110 and 111 are designed to form the skins 21 and 22 of the aerodynamic structure 20. The cavity 104a is open on the lower edge 100c and on the rear edge 100b of the preform 100. The rear edge 100b of the preform 100 corresponds to the part designed to form the trailing edge 20b of the structure with aerodynamic profile 20 (FIG. 1).

The front edge 100a of the fibrous preform 100, which connects the two portions 110 and 111 and which is intended to form the leading edge 20a of the structure with aerodynamic profile of the propeller blade, comprises no disconnection. With the two portions 110 and 111 connected by continuous weaving at the level of the front edge 100a, the structure with aerodynamic profile of the propeller blade comprises a fibrous reinforcement even at the level of the leading edge to reinforce its resistance vis-à-vis possible impacts.

Figure 5:
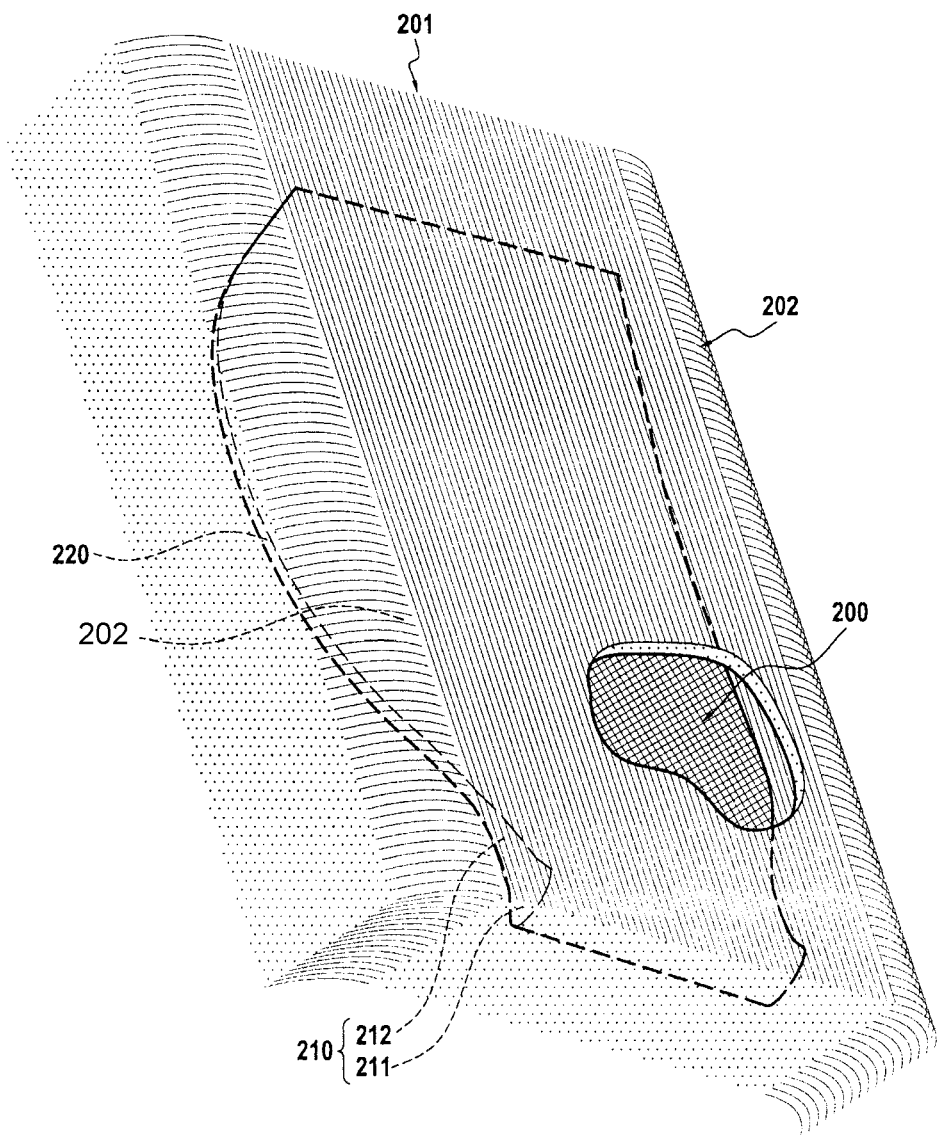
FIG. 5 is a schematic view illustrating the 3D weaving of a fibrous preform for manufacturing a longeron of the propeller blade of FIG. 1.

FIG. 5 shows highly schematically a fibrous preform 200 designed to form the fibrous preform of the longeron of the propeller blade.

Similarly for the fibrous preform 100 described hereinabove, the fibrous preform 200 is obtained, as illustrated schematically in FIG. 5, by three-dimensional weaving performed as is known on a loom of jacquard type on which on a bundle of warp threads 201 or strands is arranged in a plurality of layers of several hundreds of threads each, the warp threads being bound by weft threads 202.

The fibrous preform 200 comprises a first portion 210 and a second portion 220. The first portion 210 comprising a thickened part 211 and a part of decreasing thickness 212 designed to form respectively the foot 33 and the stilt 34 of the propeller blade 10 (FIG. 1). The stilt 34 is extended by a second portion 220 designed to form the second part 32 of the longeron 30.

Figure 7:
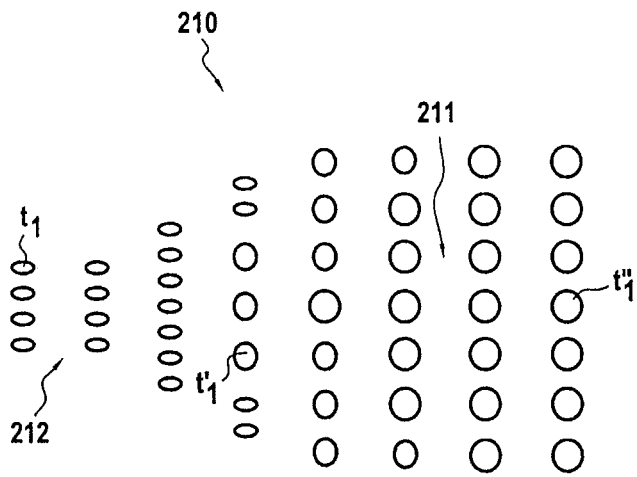
FIG. 7 is a sectional view showing an example of arranging weft threads in a fibrous preform part corresponding to a vane foot part.

During weaving of the fibrous preform 200 of the longeron 30, the thickened part 211 can be obtained by using larger weft threads and extra layers of weft threads as shown for example by FIG. 7.

In FIG. 7, the number of weft threads moves in this example from 4 to 7 between the part 212 of the strip of the fibrous preform, corresponding to the stilt of the propeller blade, and the thickened part 211 of the strip corresponding to the foot of the vane. In addition, weft threads t1, t'1, t"1 of different (increasing) thicknesses are used. By way of variant or complement, the contexture of the warp threads can be varied (number of threads per unit of length in weft direction).

According to a manufacturing variant, the thickened part 211 can be obtained by introducing an insert during weaving of the strip of the fibrous preform of the longeron. This insert can especially be made of titanium or of the same material as that of the matrix of the composite material of the beam.

The second portion 220 prolongs the part of decreasing thickness 212 and has a substantially plane form.

In accordance with the invention, the fibrous preform 200 is woven so as to present, at least in the second portion 220 designed to be arranged between the two skins 110 and 111 of the fibrous preform 100, a textile structure identical to that of the two skins 110 and 111. More precisely, the preform 200 is woven according to armour and with orientation of the warp and weft threads identical to those used for weaving the skins 110 and 111.

By way of example, if the fibrous preform 100 is woven according to "interlock" armour weaving, the fibrous preform 200 will also be woven according to this same "interlock" armour by using the same layers of weft threads to bind the same layers of warp threads for the two preforms 100 and 200.

In addition, in its main part the second portion 220 has a thickness substantially identical to those of the skins 110 and 111.

At the end of weaving (FIG. 3), the warp and weft threads are cut off for example using a pressurised water jet to the limit of the woven mass to extract the preform 200 illustrated in FIG. 6 such as it originates from 3D weaving.

In FIG. 6, conformation of the fibrous preform 100 in a preform of the structure with aerodynamic profile is done by introducing into the cavity 104a the second portion 220 and a moulded piece made of rigid material 140 here comprising two complementary elements 141 and 142. To conform the preform 100 without significantly increasing the overall mass of the structure with aerodynamic profile of the propeller blade, the piece 140 is made of rigid cellular material, that is, a material having low density. The moulded piece, or more precisely in the example described here the elements 141 and 142, can be made by moulding or by machining in a block of material. The moulded piece 140 is used when the second portion 220 does not have a shape and/or sufficient volume to form the fibrous preform 100.

Once the second portion 220 of the fibrous preform 200 and the elements 141 and 142 are in the cavity 104a, densification of the resulting fibrous preform is undertaken. The rear edge 100b of the preform is preferably closed up by sewing prior to densification.

Densification of the fibrous preform can be done in a single operation, that is, by densifying at the same time the fibrous preforms 100 and 200 once assembled. In this case, the fibrous preforms 100 and 200 are densified with the same matrix.

According to a manufacturing variant of the invention, the fibrous preform 200 can be densified only with a first matrix then be introduced to the cavity 104a of the fibrous preform 100 as described earlier, the fibrous preform 100 being densified with a second matrix which can be of a different type to that of the first matrix. In this case, the fibrous preform intended to form the reinforcement of the longeron can be densified with a matrix belonging to the thermosetting polyimide family, bismaleimide in particular, the fibrous preform intended to form the fibrous reinforcement of the structure with aerodynamic profile being densified by an organic, carbon or ceramic matrix, as described hereinbelow.

Also, the first and second fibrous preforms 100 and 200 can be made with threads comprising fibres of the same kind or different kind.

Densification of the fibrous preform consists of filling the porosity of the preform, in all or part of the volume of the latter, by the material constituting the matrix.

The matrix of the composite material comprising the structure with aerodynamic profile can be obtained as is known per se by the liquid process.

The liquid process consists of impregnating the preform with a liquid composition containing an organic precursor of the material of the matrix. The organic precursor is usually in the form of a polymer such as resin, optionally diluted in a solvent. The preform is placed in a mould which can be closed tightly with a housing having the form of the final moulded piece and able especially to have a twisted form corresponding to the definitive form of the structure with aerodynamic profile. Next, the mould is closed again and the liquid matrix precursor is injected (resin, for example) into the entire housing to impregnate the entire fibrous part of the preform.

Transformation of the precursor into organic matrix, specifically its polymerisation, is carried out by thermal treatment, generally by heating of the mould, after elimination of any solvent and reticulation of the polymer, the preform still being held in the mould having a form corresponding to that of the structure with aerodynamic profile. The organic matrix can be especially obtained from epoxy resins, such as those high-performance epoxy resins sold under the reference PR 520 by CYTEC, or liquid precursors of carbon or ceramic matrices.

In the case of formation of a carbon or ceramic matrix, thermal treatment consists of pyrolysing the organic precursor to transform the organic matrix into a carbon or ceramic matrix according to the precursor used and pyrolysis conditions. By way of example, liquid precursors of carbon can be resins with a relatively high coke rate, such as phenolic resins, whereas ceramic liquid precursors, especially SiC, can be resins of polycarbosilane type (PCS) or polytitanocarbosilane (PTCS) or polysilazane (PSZ). Several consecutive cycles, from impregnation to thermal treatment, can be completed to arrive at the preferred degree of densification.

According to an aspect of the invention, densification of the fibrous preform can be carried out by the well known process of moulding by transfer known as RTM ("Resin Transfer Moulding"). In accordance with the RTM process, the fibrous preforms 100 and 200, with the second portion 220 of the preform 200 and the elements 141 and 142 arranged inside the preform 100 as explained previously, are placed in a mould having the external form of the structure with aerodynamic profile. The second portion 220 and the elements 141 and 142 having a form corresponding to that of the structure with aerodynamic profile to be manufactured advantageously play the role of backing mould. Thermosetting resin is injected into the internal space delimited between the piece made of rigid material and the mould and which comprises the fibrous preform. A pressure gradient is generally set in this internal space between the site where the resin is injected and the evacuation orifices of the latter to control and optimise the impregnation of the preform by the resin.

The resin used can be, for example, epoxy resin. Resins adapted for RTM processes are well known. They preferably have low viscosity to facilitate being injected into the fibres. The choice of the class of temperature and/or the chemical nature of the resin is determined as a function of the thermomechanical stresses to which the piece must be subjected. Once the resin is injected into the entire reinforcement, its polymerisation is carried out by thermal treatment as per the RTM process.

After injection and polymerisation, the piece is removed from the mould. Finally, the piece is turned over to remove the excess resin and the chamfers are machined. No other machining is necessary since once the piece is moulded it respects the required ratings.

The rigid cellular material used to make the elements 141 and 142 constituting the moulded piece 140 is preferably a material with closed cells so as to prevent penetration of the resin therein and accordingly retain its low density after densification of the fibrous preform.

After densification of the fibrous preform of the structure with aerodynamic profile, the result is as illustrated in FIG. 1, a propeller blade 10 which comprises a structure with aerodynamic profile 20 made of composite material (fibrous reinforcement densified by a matrix), a longeron 30 and a moulded piece 140 made of rigid cellular material.

Figure 8:
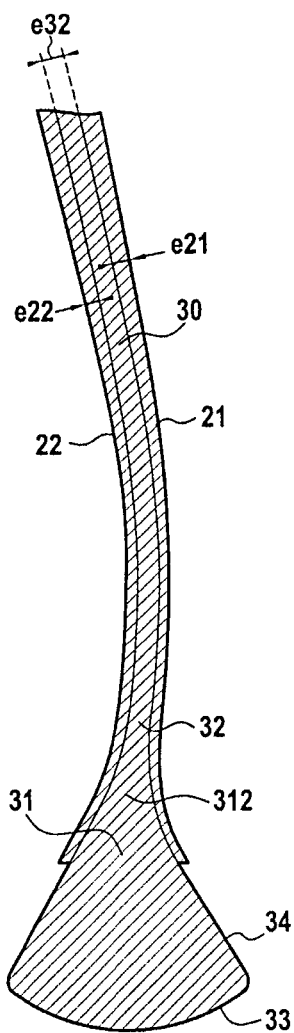
FIGS. 8 and 9 are sectional views of the propeller blade of FIG. 1.
Figure 9:
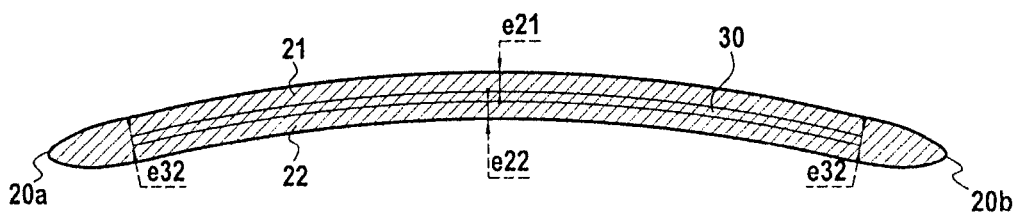

In accordance with the invention and as illustrated in FIGS. 8 and 9, the second part 32 of the longeron 30 mainly has, that is, in its part located beyond a transition zone 312 common to the first and second parts 31 and 32 for progressively reducing the thickness between these two parts, a thickness e32 substantially identical to the thickness e21 or e22 respectively of the skins e21 or e22 of the structure with aerodynamic profile 20.

More precisely, in the embodiment described here, the skins 21 and 22 have thicknesses e21 or e22 which increase progressively between the low part of the blade (at the level of the first part 31) and the apex of the blade to present a thickness at the blade apex slightly larger than that of the longeron. Inversely, the second part 32 of the longeron 30 has a thickness e32 which increases between the apex of the blade and the transition zone 312 to allow progressive absorbing of forces by the longeron at the base of the blade (i.e. blade foot).

In accordance with the invention, the variation in thickness between the thicknesses e21 and e22 of the skins 21 and 22 and the thickness e32 of the second part 32 of the longeron does not exceed 40%.

In addition, the fibrous reinforcement of the second part 32 of the longeron and the fibrous reinforcement of the skins 21 and 22 of the structure with aerodynamic profile present the same textile structure, specifically the same kind and armour orientation.

Figure 10:
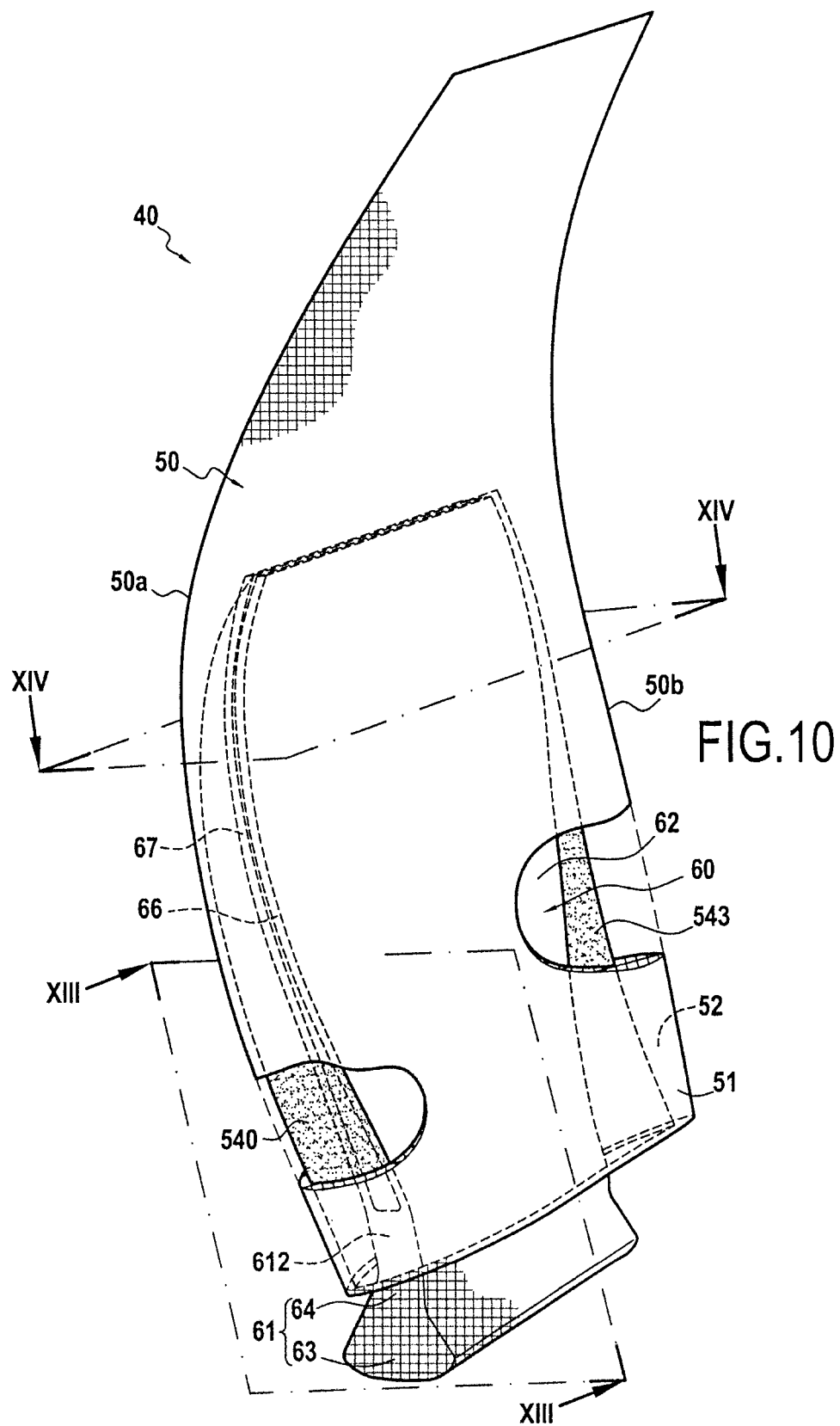
FIG. 10 is a perspective view of an aircraft propeller blade according to another embodiment of the invention.

FIG. 10 shows another embodiment of an aircraft propeller blade 40 according to the invention which differs from that described in relation to FIGS. 1 to 9 in that the longeron 60 comprises in its second part 62 designed to be arranged inside a structure with aerodynamic profile 50 a structure of "double skin" type.

Figure 11:
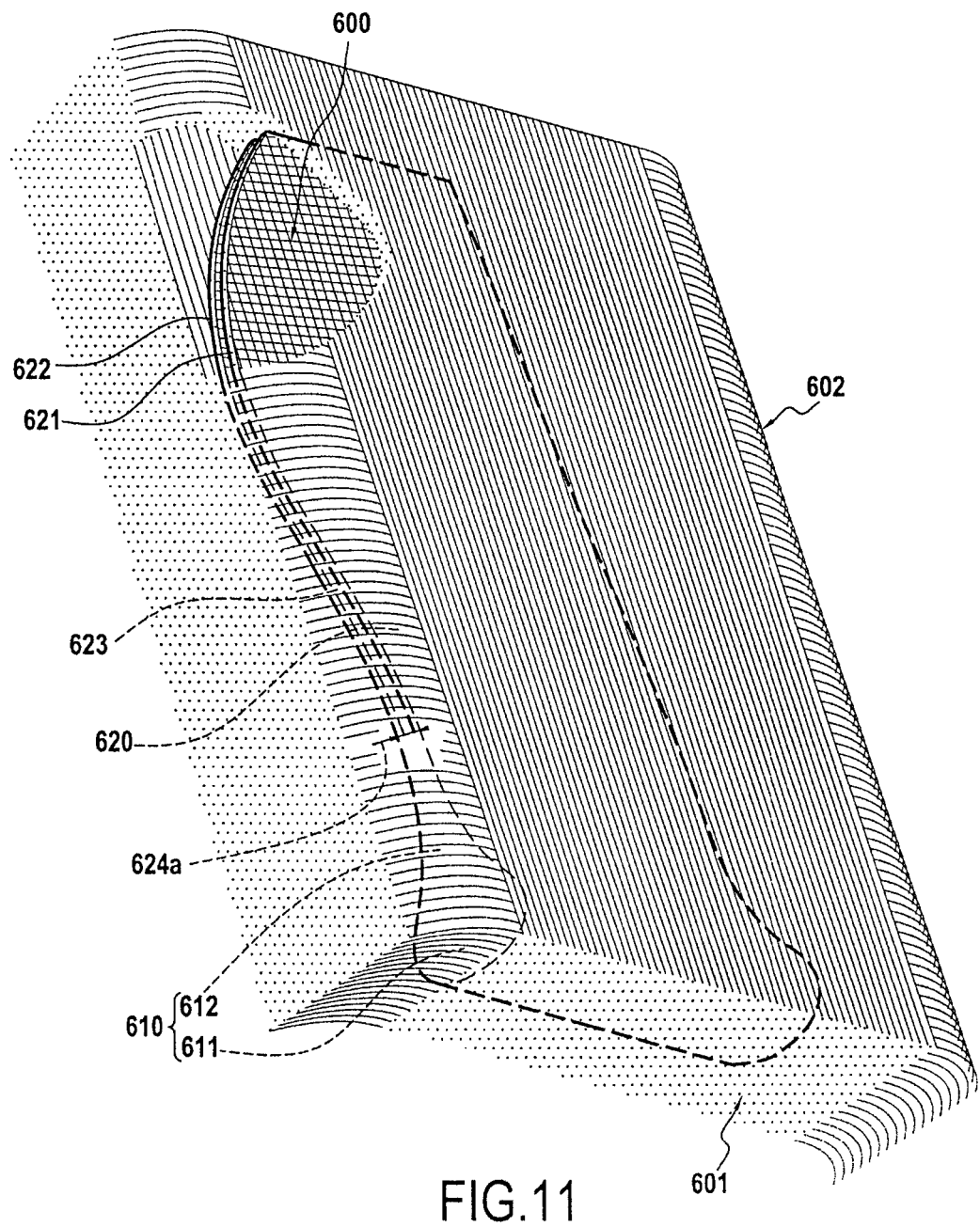
FIG. 11 is a schematic view illustrating the 3D weaving of a fibrous preform for manufacturing a longeron of the propeller blade of FIG. 10.

More precisely and as illustrated in FIG. 11, the longeron 60 is made from a fibrous preform 600 obtained by three-dimensional weaving of warp threads 601 with weft threads 602 made as is known as explained previously.

The fibrous preform 600 comprises a first portion 610 and a second portion 620, the first portion 610 comprising a thickened part 611 and a part of decreasing thickness 612 designed to form respectively the foot 63 and the stilt 64 of the propeller blade 40 (FIG. 10). The first portion 610 extended by a second portion 620 designed to form the second part 62 of the longeron 60. The thickened part 611 can be obtained by playing on the title of the weft threads and the number of extra layers of weft threads as explained hereinabove in relation to FIG. 7 or by introducing an insert during weaving of the strip of the fibrous preform of the longeron.

Figure 12:
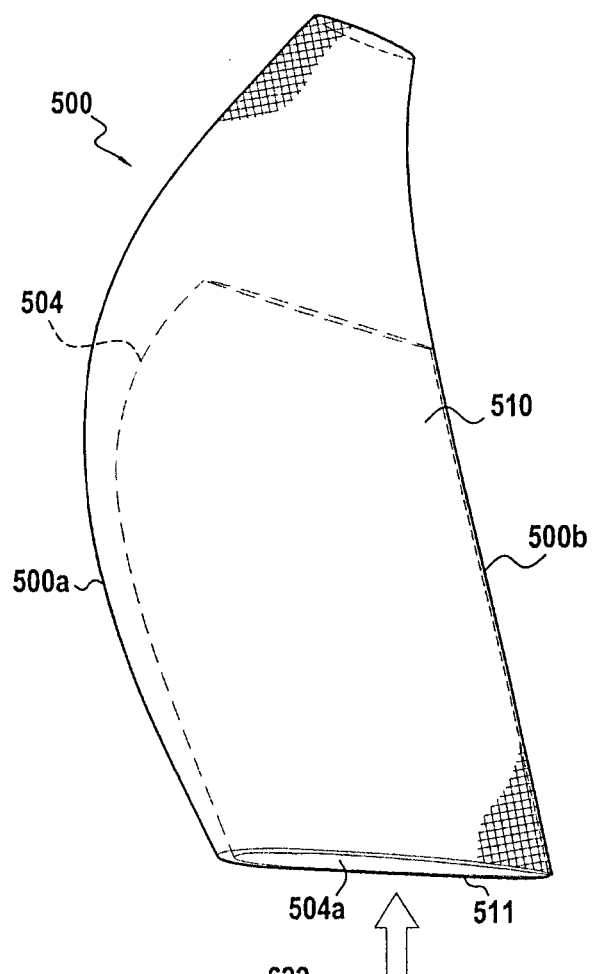
FIG. 12 is an exploded view showing the manufacture of the propeller blade of FIG. 10, FIGS. 13 and 14 are sectional views of the propeller blade of FIG. 10.
Figure 12:
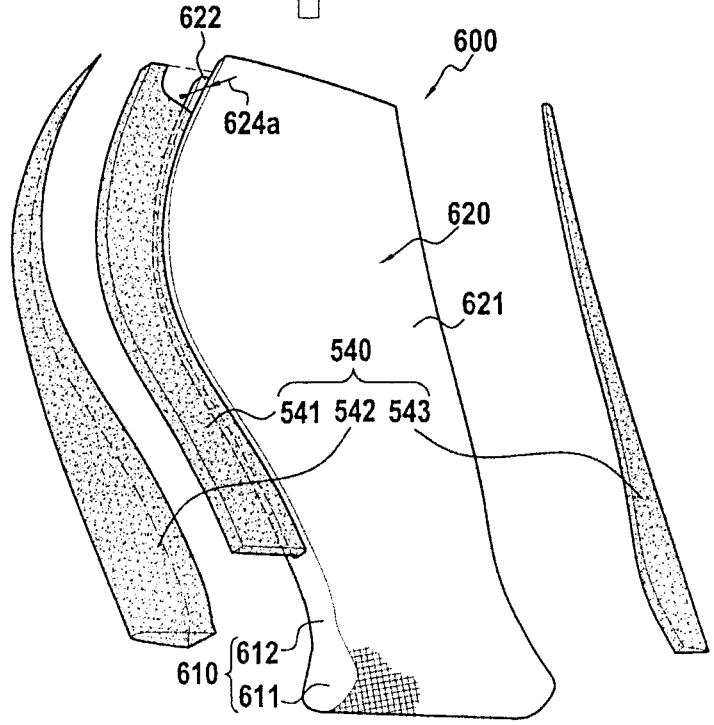

The second portion 620 is divided into two symmetrical parts 621 and 622 forming two skins spaced apart from each other. For this purpose, during weaving of the preform 600 a disconnection 623 is made inside the fibrous preform between several successive layers of warp threads (FIG. 11). The disconnection zone forms a separation space 624a between the two symmetrical parts 621 and 622 (FIG. 12). The extent of disconnection 623 as well as its thickness defining the space 624a between the two symmetrical parts 621 and 622 is for example determined by the number of layers of warp threads which are not traversed by weft threads in the case, for example, of 3D weaving with interlock armour as described hereinabove in relation to FIG. 4B.

At the end of weaving (FIG. 11), the warp and weft threads are cut off for example using a pressurised water jet to the limit of the woven mass to extract the preform 600 illustrated in FIG. 12 such as originates from 3D weaving.

FIG. 12 shows the fibrous preform 500 designed to constitute the fibrous reinforcement of the structure with aerodynamic profile 50. The fibrous preform is obtained by 3D weaving in the same way as described previously and illustrated in FIG. 3. The fibrous preform 500 comprises a cavity 504a obtained by creation of a disconnection zone 504 during weaving as already described for the preform 100, this cavity delimiting two portions 510 and 511 woven independently of each other and designed to form the skins 51 and 52 of the aerodynamic structure 50. The rear edge 500b of the preform 500 corresponds to the part designed to form the trailing edge 50b of the structure with aerodynamic profile 50 (FIG. 10). The front edge 500a of the fibrous preform 100, which connects the two portions 510 and 511 and which is intended to form the leading edge 50a of the structure with aerodynamic profile of the propeller blade, comprises no disconnection to reinforce its resistance vis-à-vis possible impacts.

In accordance with the invention, the preform 600, and more particularly the two symmetrical parts 621 and 622, present a textile structure identical to that of the two portions 510 and 511, specifically armour and orientation of the warp and weft threads identical to those used for weaving the portions 510 and 511.

In addition, the two symmetrical parts 621 and 622 have a thickness substantially identical to those of the portions 510 and 511.

At the end of weaving (FIG. 11), the warp and weft threads are cut off for example using a pressurised water jet to the limit of the woven mass to extract the preform 600 illustrated in FIG. 12 such as originates from 3D weaving.

In FIG. 12, conformation of the fibrous preform 500 in a preform of the structure with aerodynamic profile is done by introducing to the cavity 504a the second portion 620 of the preform 600 and a moulded piece made of rigid material 540 constituted here by three complementary elements 541, 542 and 543 made of rigid cellular material, that is, material having low density. The moulded piece, or more precisely in the example described here the elements 541 to 543, can be made by moulding or by machining in a block of material.

Once the second portion 620 of the fibrous preform 600 and the elements 541, 542 and 543 are in the cavity 504a, densification of the fibrous preform of the structure with aerodynamic profile is carried out, as described previously by an RTM process or other. The rear edge 500b of the preform is preferably closed up by sewing prior to densification.

After densification of the fibrous preform of the structure with aerodynamic profile, the result is as illustrated in FIG. 10, a propeller blade 40 which comprises a structure with aerodynamic profile 50 made of composite material (fibrous reinforcement densified by a matrix), a longeron 60 and a moulded piece 540 made of rigid cellular material.

Figure 13:
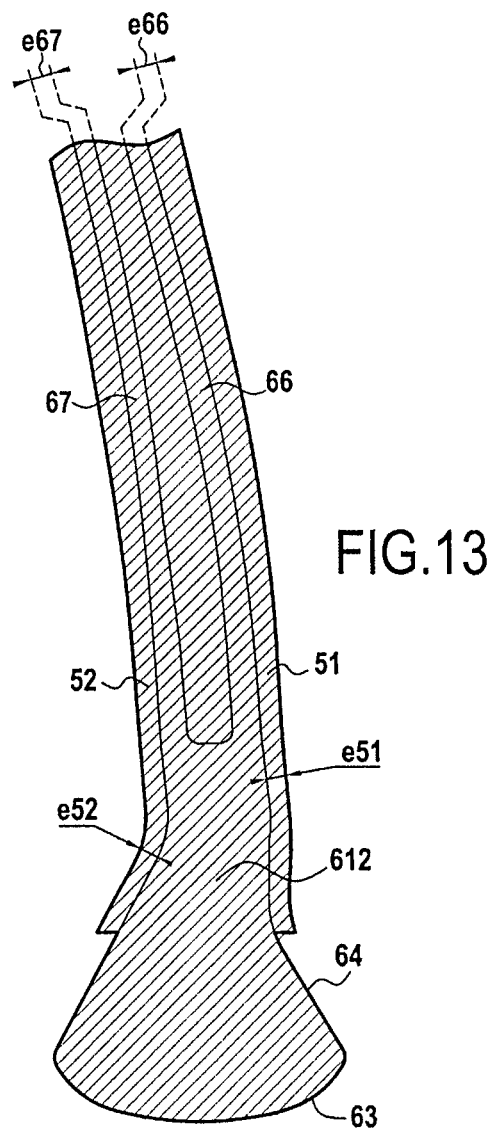
Figure 14:
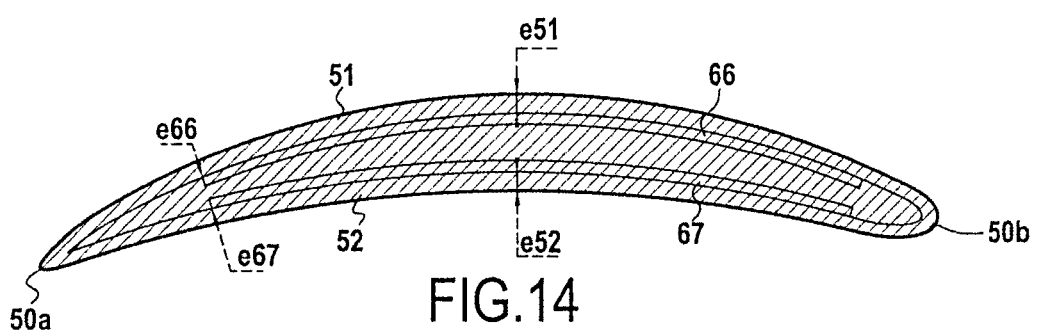

In accordance with the invention and as illustrated in FIGS. 10, 13 and 14, the second part 62 of the longeron 60 has in its main part, that is, in its part located beyond the common transition zone 612 between the first and the second parts 61 and 62, two symmetrical walls 66 and 67 formed by the two symmetrical parts 621 and 622 of the densified preform 600 and each having a thickness e66, respectively e67, substantially identical to the thickness e51 or e52 respectively of the skins 51 or 52 of the structure with aerodynamic profile 50.

More precisely, in the embodiment described here, the skins 51 and 52 have thicknesses e51 or e52 which increase progressively between the low part of the blade and the apex of the blade whereas the thicknesses e66 and e67 of the walls 66 and 67 increase between the apex of the blade and the transition zone 612 to allow progressive absorbing of forces by the longeron at the base of the blade (i.e. blade foot).

In accordance with the invention, the variation in thickness between the thicknesses e51 and e52 of the skins 51 and 52 and the thicknesses e66 and e67 of the walls 66 and 67 of the longeron does not exceed 40%.

In addition, the fibrous reinforcement of the second part 62 comprising the two symmetrical walls 66 and 67 and the fibrous reinforcement of the skins 51 and 52 of the structure with aerodynamic profile have the same textile structure, specifically the same kind and armour orientation.

Figure 15:
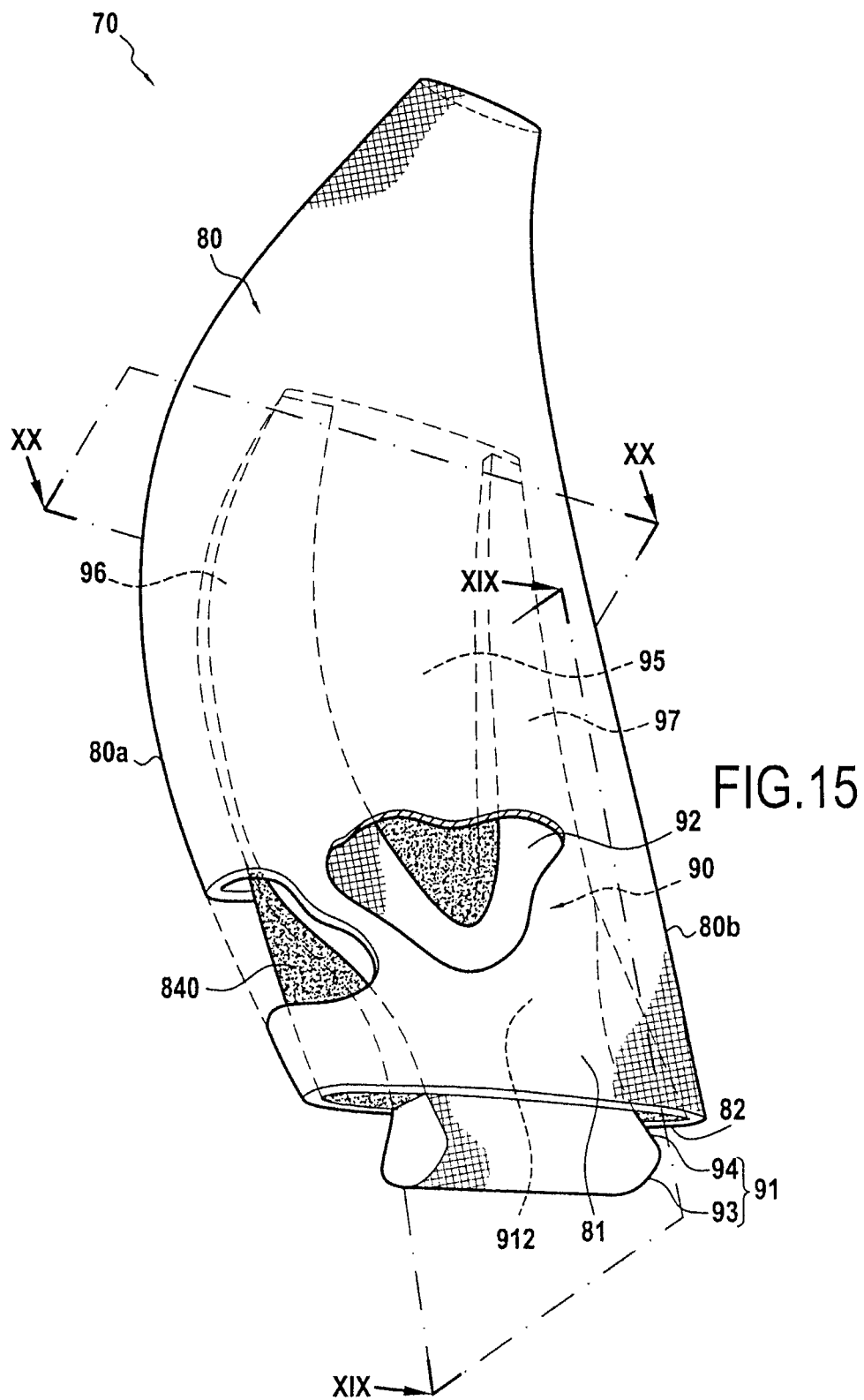
FIG. 15 is a perspective view of an aircraft propeller blade according to another embodiment of the invention.

FIG. 15 shows yet another embodiment of an aircraft propeller blade 70 according to the invention which differs from that described in relation to FIGS. 1 to 9 in that the longeron 90 comprises in its second part 92 designed to be arranged inside a structure with aerodynamic profile 80 a recess 95 delimiting two legs 96 and 97 and in that the structure with aerodynamic profile 80 is obtained from a fibrous preform 800 corresponding to the concept of the structure with aerodynamic profile 80 of the propeller blade 70.

Figure 16:
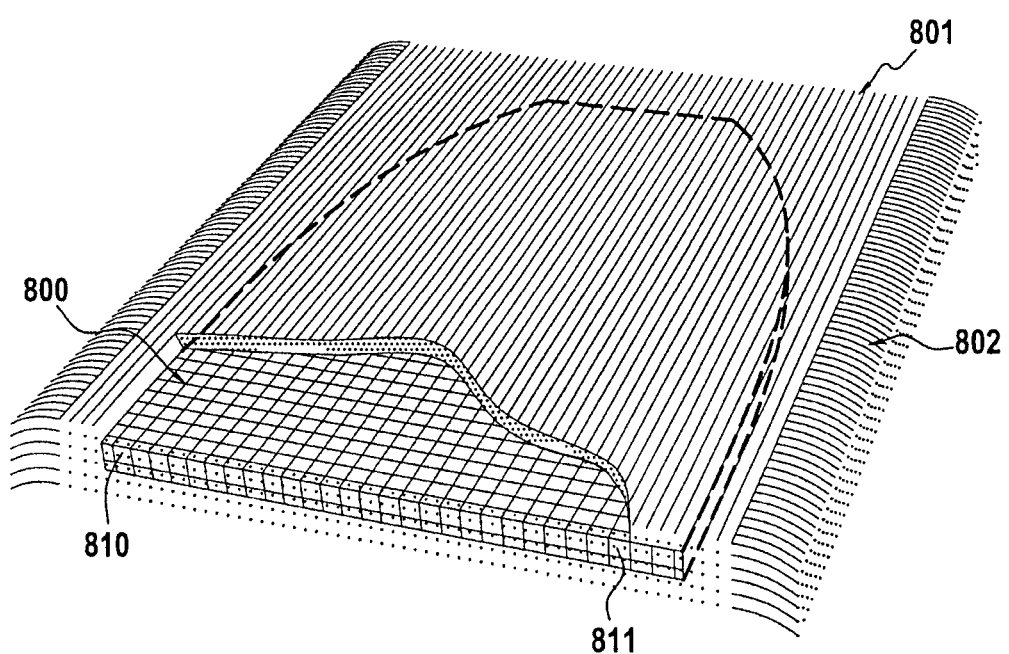
FIG. 16 is a schematic view illustrating the 3D weaving of a fibrous preform for manufacturing a structure with aerodynamic profile of the propeller blade of FIG. 15.

As illustrated schematically in FIG. 16, the fibrous preform 800 is obtained by 3D weaving, for example of interlock type, between warp threads 801 or strands arranged in a plurality of layers of several hundreds of threads each, and weft threads 802. Throughout weaving of the preform whereof the width and optionally the thickness vary, a certain number of warp threads is not woven, which defines the preferred contour and the thickness, continuously variable, of the preform 800. Once the preform is woven, the non-woven warp and weft threads are cut off to produce the fibrous preform illustrated in FIG. 18.

The fibrous preform 800 has two symmetrical portions 810 and 811 interconnected by continuous weaving at the level of a fold line 800a designed to form the leading edge 80a of the structure with aerodynamic profile 80 of the propeller blade 70.

Figure 17:
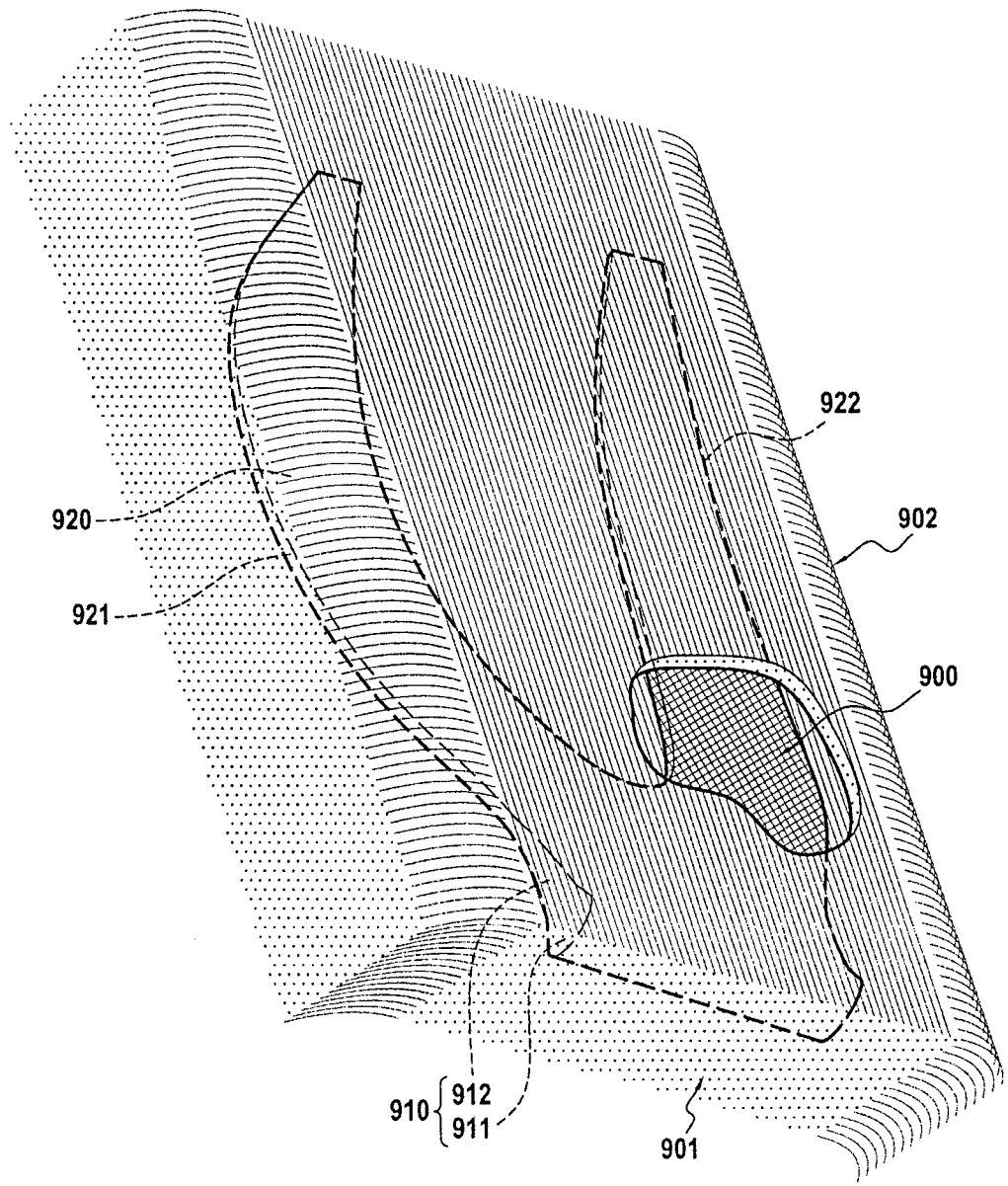
FIG. 17 is a schematic view illustrating the 3D weaving of a fibrous preform for manufacturing a longeron of the propeller blade of FIG. 15.

As illustrated in FIG. 17, the longeron 90 is made from a fibrous preform 900 obtained by three-dimensional weaving of warp threads 901 with weft threads 902, made as is known and as explained previously. The fibrous preform 900 comprises a first portion 910 and a second portion 920, the first portion 910 comprising a thickened part 911 and a part of decreasing thickness 912 designed to form respectively the foot 93 and the stilt 94 of the propeller blade 40 (FIG. 1). The stilt 94 is extended by a second portion 920 designed to form the second part 92 of the longeron 90.

Figure 18:
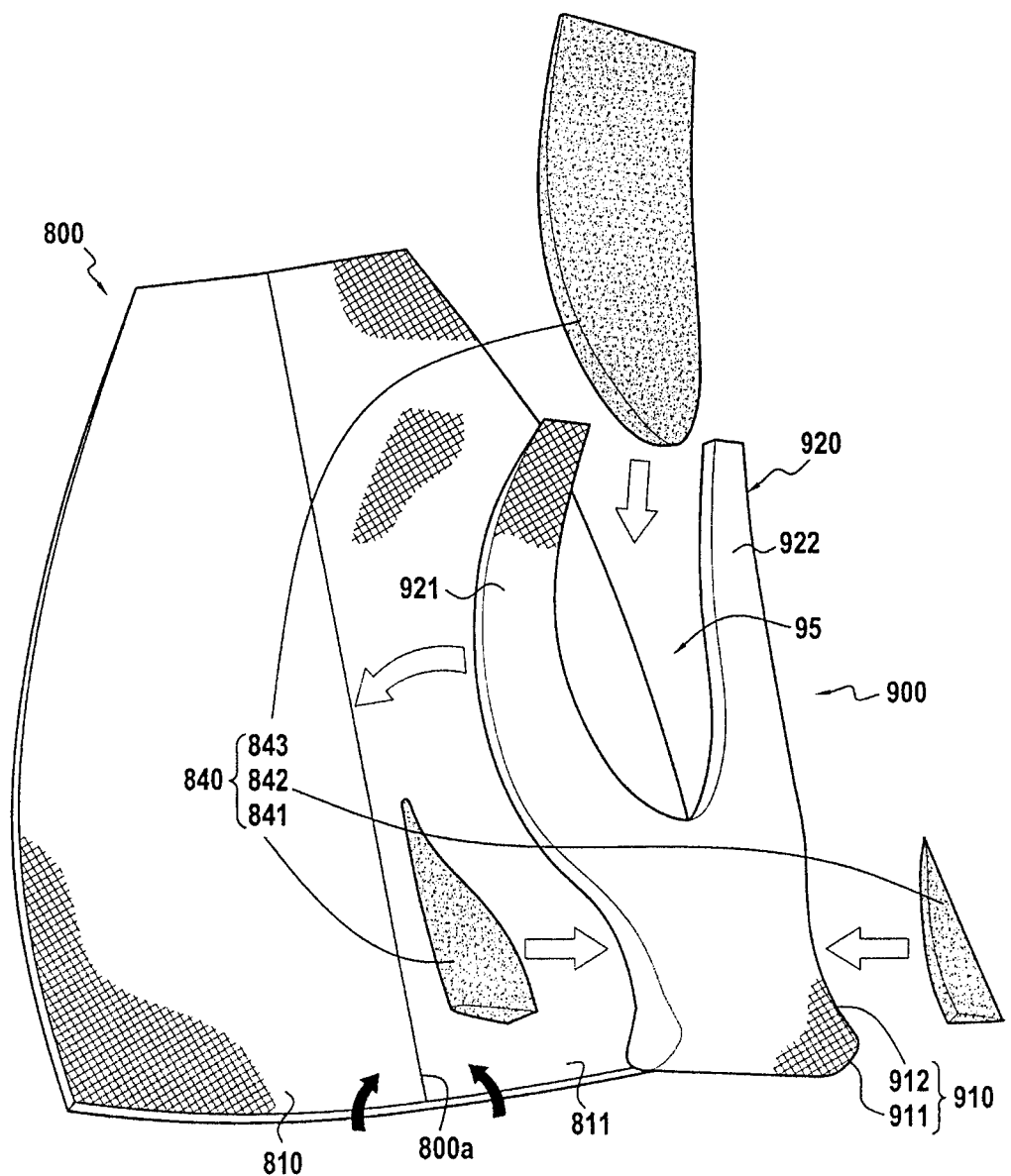
FIG. 18 is an exploded view showing the manufacture of the propeller blade of FIG. 15, FIGS. 19 and 20 are sectional views of the propeller blade of FIG. 15.

At the end of weaving (FIG. 17), the warp and weft threads are cut off at the limit of the woven mass to extract the preform 900 illustrated in FIG. 18 such as originates from 3D weaving. The second portion 920 has a central recess 95 (FIG. 18), made for example by a pressurised water jet so as to delimit in the latter two parts 921 and 922 designed to form the two legs 96 and 97 of the second part 92 of the longeron 90. During weaving of the second portion 620 of the preform 900 the recess 95 can be already delimited by not weaving the warp threads and the weft threads together in the central zone where the recess 95 is to be formed.

In accordance with the invention, the second portion 920 comprising the two parts 921 and 922 is woven according to armour and with orientation of weft and warp threads identical to those of the fibrous preform 800 constituting the fibrous reinforcement of the structure with aerodynamic profile 80. In addition, the thickness of the second portion 920 and in particular those of two parts 921 and 922 are defined to be substantially equal to those of the zones of the two portions 810 and 820 of the fibrous preform 800 which will be opposite to these two parts.

The second portion 920 of the fibrous preform 900 as well as a moulded piece 840 composed of three elements 841, 842 and 843 formed from rigid cellular material of the same kind as that of the elements 141 and 142 described previously are placed on one of the two portions 810 and 811, for example the portion 811, the other free portion, here the portion 810, being folded back onto the portion 811. Densification of the fibrous preform of the structure with aerodynamic profile is then conducted by liquid method, as described previously.

After densification of the fibrous preform of the structure with aerodynamic profile, the result is as illustrated in FIG. 15, a propeller blade 70 which comprises a structure with aerodynamic profile 80 made of composite material (fibrous reinforcement densified by a matrix), a longeron 90 and a moulded piece 840 made of rigid cellular material.

In accordance with the invention and as illustrated in FIGS. 19 and 20, the second part 92 of the longeron 90 has in its main part, that is, in its part located beyond the common transition zone 912 between the first and the second parts 91 and 92, two legs 96 and 97 formed by the two parts 921 and 922 of the densified preform 900 and each having a thickness e96 substantially identical to the thickness e81 or e82 respectively of the skins 81 or 82 of the structure with aerodynamic profile 80.

More precisely, in the embodiment described here, the skins 81 and 82 have thicknesses e81 or e82 which increase progressively between the low part of the blade and the apex of the blade whereas the thicknesses e96 and e97 of the legs 96 and 97 increase between the apex of the blade and the transition zone 912 to allow progressive uptake of forces by the longeron at the base of the blade (i.e. blade foot).

In accordance with the invention, the variation in thickness between the thicknesses e81 and e82 of the skins 81 and 82 and the thicknesses e96 and e97 of the legs 96 and 97 of the longeron does not exceed 40%.

In addition, the fibrous reinforcement of the second part 92 comprising the two legs 96 and 97 and the fibrous reinforcement of the skins 81 and 82 of the structure with aerodynamic profile 80 have the same textile structure, specifically the same kind and orientation of armour.

The space present between the two symmetrical portions 66 and 67 of the longeron 60 of the vane 40 illustrated in FIG. 10 or the recess 95 present between the two legs 96 and 97 of the longeron 90 of the vane 70 illustrated in FIG. 15 can be advantageously used for inserting devices therein (for example heating conductors for deicing) or ducts for circulation of fluid inside the vane (for example for blowing or cooling of the blade).

The invention claimed is:

1. A blade comprising:
    a structure with aerodynamic profile comprising first and second opposite skins obtained by three-dimensional weaving of a fibrous reinforcement densified by a matrix,
    a longeron comprising a fibrous reinforcement obtained by three-dimensional weaving and densified by a matrix, said longeron comprising a first part extending outside said structure with aerodynamic profile and designed to be connected to a drive hub in rotation of the blade and a second part arranged inside the structure with aerodynamic profile between the first and second skins,
    the second part of said longeron comprising one or two portions each having a thickness substantially similar to that of the first and second skins of the structure with aerodynamic profile, and
    the fibrous reinforcement of the second part of the longeron having a same weaving armour as that of the reinforcement of the first and second skins of the structure with aerodynamic profile.

2. The blade according to claim 1, wherein the first part of the longeron extends underneath the second part of the longeron in increasing thickness.

3. The blade according to claim 1, wherein a variation in thickness between the thickness of the first and second skins and the thickness of the second part of the longeron is less than 40%.

4. The blade according to claim 1, wherein the second part of the longeron comprises first and second symmetrical portions, the first symmetrical portion arranged opposite to the first skin of the structure with aerodynamic profile and the second symmetrical portion arranged opposite to the second skin, each respective symmetrical portion having a thickness substantially similar to that of the respective skin adjacent to the structure with aerodynamic profile.

5. The blade according to claim 4, wherein at least one moulded piece made of rigid cellular material is arranged between the first and second symmetrical portions.

6. The blade according to claim 1, wherein the second part of the longeron comprises two legs spaced apart from each other by a central recess and each having a thickness substantially similar to that of the first and second skins of the structure with aerodynamic profile.

7. The blade according to claim 6, wherein at least one moulded piece made of rigid cellular material is arranged in the central recess.

8. The blade according to claim 1, wherein the structure with aerodynamic profile comprises a reinforcement made with first fibres and densified by a first matrix and the longeron comprises a reinforcement made with seconds fibres and densified by a second matrix, at least one of the first and second fibres and the first and second matrices being different in kind.

9. The blade according to claim 1, wherein the structure with aerodynamic profile and the longeron comprise a reinforcement of carbon fibres densified by a carbon matrix.

10. A manufacturing process of a blade comprising:
    manufacturing a first fibrous preform of a structure with aerodynamic profile by three-dimensional weaving of threads, said first preform comprising first and second skins delimiting therebetween an internal space,
    manufacturing a second fibrous preform of a longeron by three-dimensional weaving of threads, said second preform comprising a first portion and a second portion, the second portion having a thickness substantially equal to that of the first and second skins of the first preform and armour identical to that of said first and second skins,
    forming of the first fibrous preform to produce a preform of structure with aerodynamic profile, said forming comprising arranging of the second portion of the second preform in the internal space between the first and second skins of the first fibrous preform, and
    densification of the first and second preforms by a matrix to produce the blade comprising a structure with aerodynamic profile and a longeron, each having a fibrous reinforcement densified by the matrix.

11. The process according to claim 10, wherein, during the manufacturing of the second fibrous preform of the longeron, the second portion of said second fibrous preform is divided into first and second symmetrical parts in the direction of the thickness of said second portion, the first symmetrical part and the second symmetrical part each having a thickness substantially similar to that of the first skin and the second skin of the first fibrous preform, respectively, the first symmetrical part and the first skin designed to be opposite each other and the second symmetrical part and the second skin designed to be opposite each other during the forming of the first fibrous preform.

12. The process according to claim 11, wherein, during the forming of the first fibrous preform, at least one moulded piece made of rigid cellular material is arranged between the first and second symmetrical parts of said second portion.

13. The process according to claim 10, wherein, during the manufacturing of the second fibrous preform of the longeron, a central recess is made in the second portion of said second fibrous preform, said recess delimiting two parts spaced apart from each other by the central recess and each having a thickness substantially similar to that of the first and second skins of the structure with aerodynamic profile.

14. The process according to claim 13, wherein, during the forming of the first fibrous preform, at least one moulded piece made of rigid cellular material is arranged in the central recess.

15. The process according to claim 10, wherein the first portion of the second fibrous preform further comprises a thickened part extended by a part of decreasing thickness towards the second portion of the second preform and said thickened part and part of decreasing thickness form respectively, after the densification, a foot and a blade stilt.

16. A manufacturing process of a blade comprising:
    making a first fibrous preform of a structure with aerodynamic profile by three-dimensional weaving of threads, said first preform comprising first and second skins delimiting therebetween an internal space, making a second fibrous preform of a longeron by three-dimensional weaving of threads, said second preform comprising a first portion and a second portion, the second portion having a thickness substantially equal to that of the first and second skins of the first preform and armour identical to that of said first and second skins, densification of the second fibrous preform by a first matrix, forming the first fibrous preform to obtain a preform of structure with aerodynamic profile, said forming comprising arranging of the second portion of the second densified preform in the internal space between the first and second skins of the first fibrous preform, and densification of the first preform by a second matrix of a kind different to that of the first matrix to obtain the blade comprising a structure with aerodynamic profile and a longeron, each having a fibrous reinforcement densified by the matrix.

17. A turboprop equipped with a blade or propeller blade according to claim 1.

18. An aircraft equipped with at least one turboprop according to claim 17.

* * * * *

UNITED STATES PATENT AND TRADEMARK OFFICE
CERTIFICATE OF CORRECTION

PATENT NO. : 9,616,629 B2
APPLICATION NO. : 13/732884
DATED : April 11, 2017
INVENTOR(S) : Adrien Jacques Philippe Fabre et al.

It is certified that error appears in the above-identified patent and that said Letters Patent is hereby corrected as shown below:

On the Title Page

Item (30), the Foreign Application Priority Data has been omitted. Item (30) should read:
-- (30) Foreign Application Priority Data
Jul. 2, 2010 (FR) ..................................... 1055360 --

Signed and Sealed this
Tenth Day of July, 2018

Andrei Iancu
*Director of the United States Patent and Trademark Office*